Figure 1:
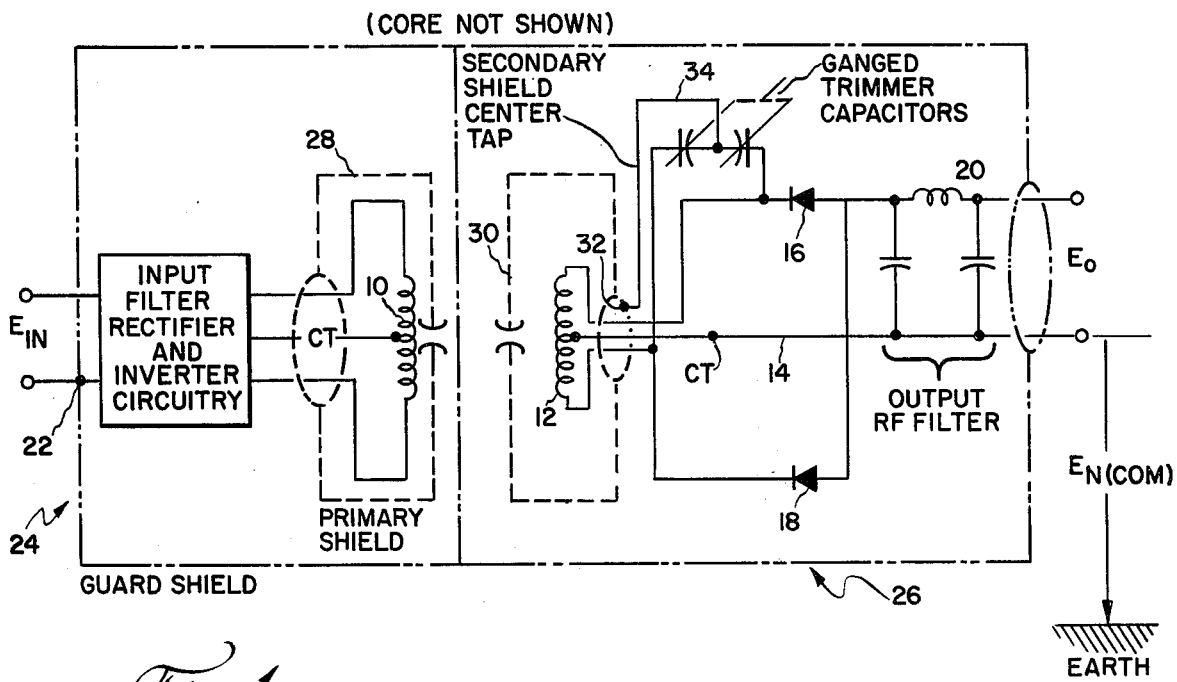

United States Patent [19]

Gauper, Jr. et al.

[11] 3,963,975
[45] June 15, 1976

[54] ELECTROMAGNETICALLY SHIELDED ELECTRICAL POWER SUPPLY WITH REDUCED COMMON MODE ELECTROMAGNETIC INTERFERENCE OUTPUT

[75] Inventors: Harold A. Gauper, Jr., Scotia; John P. Walden, Schenectady, both of N.Y.

[73] Assignee: General Electric Company, Schenectady, N.Y.

[22] Filed: Mar. 5, 1975

[21] Appl. No.: 555,424

[52] U.S. Cl. .................................. 321/2; 307/91; 336/84; 307/150
[51] Int. Cl.² ....................................... H02M 3/22
[58] Field of Search ............... 174/35 CE, 35 MS; 307/91, 150; 321/2, 8 R; 336/84 R, 84 C

[56] References Cited
UNITED STATES PATENTS

| | | | |
|---|---|---|---|
| 792,248 | 6/1905 | Campbell | 336/84 X |
| 2,081,979 | 6/1937 | Bentley | 307/91 X |
| 2,914,719 | 11/1959 | Walton et al. | 336/84 X |
| 3,084,321 | 4/1963 | Hinrichs et al. | 307/91 X |
| 3,244,960 | 4/1966 | Stevens et al. | 321/8 R |
| 3,337,784 | 8/1967 | Lueder | 307/150 X |
| 3,465,232 | 9/1969 | Weber | 321/8 R |
| 3,522,509 | 8/1970 | Hasenbalg | 321/2 |
| 3,582,754 | 6/1971 | Hoffmann et al. | 321/2 |
| 3,851,287 | 11/1974 | Miller et al. | 336/84 |

Primary Examiner—William M. Shoop
Attorney, Agent, or Firm—Jerome C. Squillaro; Joseph T. Cohen; Julius J. Zaskalicky

[57] ABSTRACT

A signal pickup means is provided in a power supply having an inverter driven transformer therewithin for producing a cancellation signal substantially equal in magnitude and opposite in phase with respect to an unwanted common mode interference signal which otherwise appears on the electrical output from the secondary windings of the transformer with respect to an electrically isolated electromagnetic shield about the exterior of the power supply. This signal pickup is connected to the secondary winding and to an electrostatic shield about the secondary winding so as to effectively add the cancellation signal to the interference signal thereby substantially eliminating and reducing the unwanted common mode emanations from the output of the power supply. Preferably, the signal pickup is connected to substantially reduce unwanted common mode potentials between the center tap of the secondary windings and other shielding of the power supply in spite of electrical isolation therebetween. It is further preferred that the secondary winding shield to which the signal pickup is attached have a center-tapped connection located at a null point on the shield where the induced voltages in the shield are substantially balanced out to a minimum magnitude and the signal pickup is electrically connected at such a shield center-tapped connection point.

19 Claims, 2 Drawing Figures

ELECTROMAGNETICALLY SHIELDED ELECTRICAL POWER SUPPLY WITH REDUCED COMMON MODE ELECTROMAGNETIC INTERFERENCE OUTPUT

This invention relates generally to techiques and apparatus for reducing electromagnetic interference (EMI) and, in particular, for reducing EMI in an electrical power supply which is electromagnetically shielded and which has an inverter driven transformer therewithin including an electrostatic shield about the secondary windings of the transformer which is electrically isolated from the other electrostatic shielding associated with other components of the power supply thereby giving rise to a potential common mode EMI signal superimposed upon the electrical output from the secondary windings with respect to the other shielding.

This application is related to the disclosure in the copending, commonly owned application of Mr. Harold A. Gauper, Jr., filed concurrently herewith. In this copending application, a special form of center-tapped connection for an electrostatic shield is disclosed with which the invention described below is particularly useful as a furhter improvement in EMI attenuation over the techniques described in the related copending application. All of the disclosure in the copending application filed concurrently herewith is hereby expressly incorporated by reference.

This invention has been developed in particular for use with a line cord power supply such as those described in earlier filed copending commonly owned applications Ser. Nos. 406,162 filed Oct. 15, 1973 now abandoned; 416,115 filed Nov. 15, 1973; 434,580 filed Jan. 18, 1974 now U.S. Pat. No. 3,909,700 and 474,669 filed May 30, 1974 now U.S. Pat. No. 3,880,491. Those in the art will recognize that the techniques and apparatus described herein for EMI reduction will also be useful with other types of power supply units. Nevertheless, for facilitating the explanation of this invention, an exemplary embodiment of this invention will be described in connection with a typical line cord power supply unit as described in these earlier copending applications referenced above.

Typically, such line cord power supply units are powered by an input alternating current from the typical household power supply at 115V 60Hz. This input alternating current is filtered, rectified and utilized to drive an inverter which produces a relatively high frequency (i.e., 18 KHz or even higher in frequency) square wave alternating current driving the primary of a transformer. The transformer is utilized in the power supply unit to provide necessary electrical isolation between input and output for safety purposes since such units are normally to be utilized by the public at large. The primary of such a transformer is magnetically linked to a secondary winding which, because of the magnetic coupling, produces a similar substantially square wave shaped high-frequency alternating current at its output terminals which is then rectified and filtered to produce a desirable d.c. output voltage from the power supply unit. Typically, the transformer windings are center-tapped with a connection from the center-tap of the secondary winding becoming one of the output terminals of the power supply unit.

As will be appreciated by those in the art, a square wave shaped alternating current is comprised of a great number of harmonic components of considerable magnitude. Especially because of this and because the inverter in such circuitry operates at a fairly high frequency to reduce the necessary size of the unit, etc., there are substantial sources of EMI within such a circuitry and, in particular, especially in the transformer windings, inverter circuitry and rectifier circuitry. To reduce such EMI emanations which would otherwise cause undue interference with nearby radio receivers, etc., metallic electrostatic shielding is provided about many of the EMI sources and about the entire unit. However, because of the necessary isolation which must be maintained electrically between the input and output terminals, it is not possible to reference all of the electrical shielding of the EMI sources to a common electrical potential. Rather, it is contemplated that the outermost electrostatic shield will usually be referenced to one of the two input terminals of the power supply unit, which, when connected in the normal household alternating current supply, will provide a relatively reasonable finite impedance to earth potential in an RF or EMI sense.

However, in such a case, the secondary windings of the transformer are still electrically isolated (i.e, no direct electrical conductive connection) from this outermost shield. Due to slight circuitry imbalance, unsymmetrical construction techniques, etc., which are impossible to avoid completely, the thusly electrically isolated secondary windings have been observed to have a common mode interference EMI signal superimposed thereon with respect to the outer electrical shield. The center-tapped electrostatic shielding techniques disclosed in the above referenced copending application of Harold A. Gauper, Jr., provide substantial attenuation of such common mode EMI. However, even with the improvement provided by such center-tapped electrostatic shielding tecnhiques, it is still possible for common mode EMI to be present in such magnitudes as to interfere with highly sensitive nearby electrical circuitry.

Now, however, further EMI suppression techniques and/or apparatus have been discovered for even further suppressing the unwanted common mode EMI output.

For example, in the exemplary embodiment of the earlier referenced copending application of Harold A. Gauper, Jr., the secondary winding is center-tapped and an electrostatic shield about the secondary winding is itself center-tapped and electrically connected from the shield center tap through the winding center tap. If the shielding is exactly symmetrical and if the winding is exactly symmetrical and if the shield center tap and winding center tap are precisely and exactly positioned, then theoretically the center tap lead from the secondary of the transformer winding should be maintained at substantially zero volts with respect to the outermost electrostatic shield about the power supply unit. However, in actual practice, it has been observed that the center tap of such an output transformer will commonly have superimposed thereon a common mode EMI signal of substantially the same wave shape and frequency as the inverter output voltage and having a magnitude of approximately one percent thereof or less.

It has now been discovered that this unwanted common mode EMI may be substantially reduced by a factor of approximately 100 or more times by providing a signal pickup which produces a cancellation signal substantially equal in magnitude and of opposite phase with respect to the unwanted common mode EMI and then connecting such cancellation signal between the secondary winding and the electrostatic shielding about the secondary winding so as to effectively add the cancellation signal to the unwanted EMI signal thereby substantially reducing the unwanted common mode signal emanations from the output of the power supply unit.

Others have broadly proposed the elimination of unwanted electrical signals by adding thereto another signal of equal magnitude and opposite phase. For instance, prior U.S. Pat. No. 2,136,659 — Wood broadly teaches such a concept. Further, prior U.S. Pat. No. 2,895,059 — Bell broadly relates to ripple elimination circuitry for connection between a transformer center tap and the ends of the center-tapped winding. However, such prior art fails to teach or suggest the improvements of this invention, especially in the context of an inverter driven shielded power supply.

As mentioned earlier, the preferred exemplary embodiment comprises the center-tapped secondary winding wherein the signal pickup is connected so as to substantially reduce the electrical potential between the center tap of the secondary windings and the external overall electrostatic shielding of the unit while additionally providing electrical isolation which continues to exist between the secondary windings and such overall shielding.

In a first exemplary embodiment, the secondary winding of the center tap is serially connected with the cancellation signal and the secondary electrostatic shield. In this embodiment, the pickup means may actually comprise a separate transformer winding with a voltage divider thereacross for developing the desired magnitude and phase of cancellation signal. Another embodiment involves placing a voltage divider across the complete secondary winding for providing the necessary magnitude and phase of cancellation signal. In both embodiments, the connection to the secondary shield is preferably made at a center tap connection on the shield located at a null point where the induced voltages in the shield are substantially balanced out to a minimum magnitude.

Figure 2:
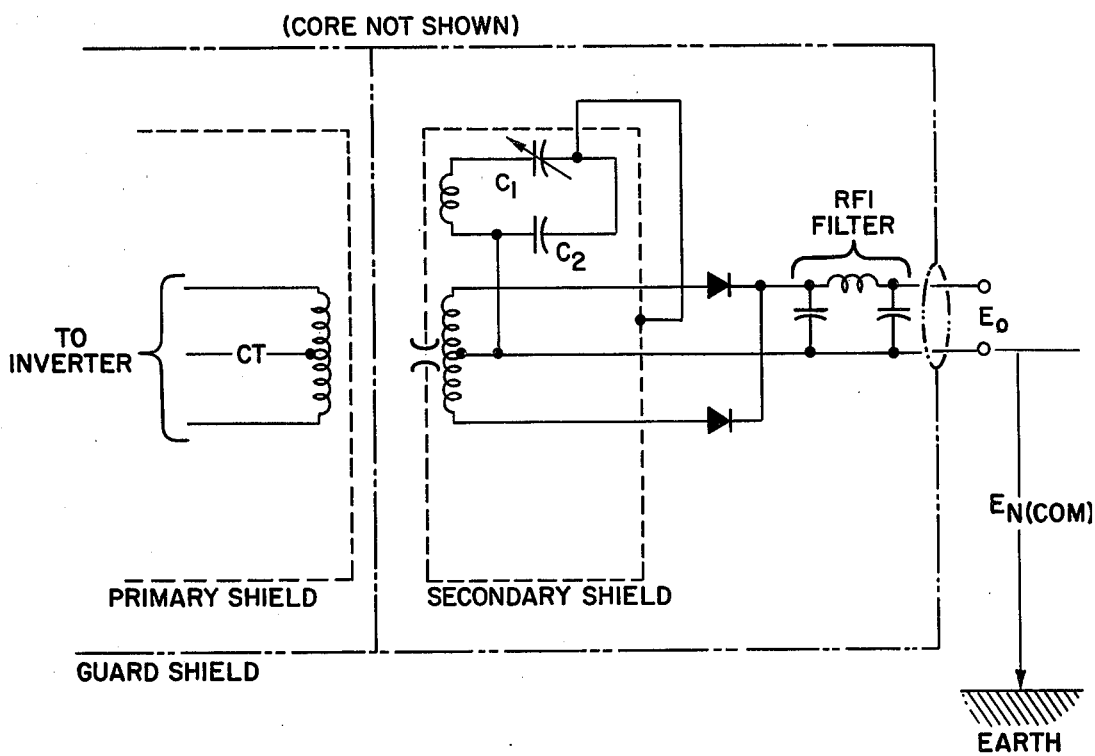

These and other features and advantages of the invention will be more fully appreciated and understood from the following detailed discussion and description thereof taken in conjunction with the accompanying drawings, of which:

FIG. 1 is a schematic depiction of an electromagnetically shielded electrical power supply having an inverter driven transformer therewithin and including EMI cancellation apparatus according to the teachings of this invention; and FIG. 2 is a schematic diagram of another exemplary embodiment of EMI reduction apparatus according to this invention for use with such an electromagnetically shielded electrical power supply unit.

The basic power supply circuitry shown in FIGS. 1 and 2 is an exemplary type of circuitry used in line cord power supply units wherein $E_{in}$ is the usual 115V alternating current 60Hz supply which is passed through an input filter and rectifier to produce a d.c. supply for driving an inverter. The inverter produces relatively high frequency square wave shaped alternating voltage through a transformer primary winding 10. The transformer primary winding is magnetically linked (magnetic core not shown) to a secondary winding 12 which produces similar high frequency substantially square wave shaped output voltage thereacross. In the exemplary embodiment shown in FIG. 1, the secondary winding 12 is center-tapped with a connection line 14 from the transformer winding center tap becoming one of the output terminals. The outer terminals of the secondary winding 12 are connected to the usual diode rectifying units 16, 18 and through an output filter 20 to produce the desired d.c. output voltage $E_o$.

As should be appreciated, there are many sources of EMI signals within such circuitry due to the square wave shapes involved (i.e., rich in harmonic components) and to the relatively high fundamental frequency of the inverter circuitry itself. Typically, there are many electrostatic shields provided about one or more of the EMI sources and an outer guard shield provided about the entire circuitry. A more complete exemplary showing of such a system of electrostatic shields is given in the above referenced copending related application of Harold A. Gauper, Jr. However, since such a detailed showing of a complete electrostatic shielding system is not necessary for understanding this invention, only a partial showing of such a shielding system is given in FIGS. 1 and 2 of this application.

As shown in FIG. 1, it is typical for the outermost guard shield to be referenced (with respect to RF) to one of the input leads such as at 22 from which there is a finite RF impedance to earth reference potential. At the same time, because of required isolation between input and output terminals, it should be noted that the guard shield is not electrically connected to the output terminals. Furthermore, the guard shield typically comprises two substantially enclosed volumes 24, 26 with such enclosed volumes being defined by electrically conductive surfaces which substantially enclose the volumes except for gaps in electrical conductivity provided to prevent such enclosures from effectively becoming shorted electrical circuits with respect to electrical wires passing through said gaps. Typically, a first guard shield section 24 will enclose the input circuitry including the primary of the transformer while a second portion of the guard shield will enclose the output circuitry including the secondary winding of the transformer. It is understood that within such overall outer guard shielding, there may be one or more further electrostatic shields associated with one or more of the individual EMI sources in the input and output sections respectively. As shown in FIG. 1, only the inner primary shield 28 and the inner secondary shield 30 are depicted to simplify the explanation of this invention.

In the preferred embodiment of this invention, the primary shield 28 and secondary shield 30 are preferably "center-tapped" for their connection to a reference point as explained more fully in the above cited copending related application of Harold A. Gauper, Jr. Briefly stated, such a center tap connection is made at a null point on the shield surface where the induced voltages in the shield are normally substantially balanced out to a minimum magnitude such that there is a minimal EMI injection signal from such a center tap connection to a reference point which reference point itself may be susceptible to change due to injection voltages it is not absolutely referenced to some electrical potential such as earth which is relatively immune to change from minor injection voltages. In the case of the usual electrostatic shield having a gap in electrical conductivity, such center tap or null point connection is located substantially opposite the gap. Another way of stating it is to note that center tap connection in such an exemplary embodiment would be electrically one-half way about the circumference of the coil from the location of the gap in electrical conductivity in the shield surface.

The center-tapped shield connection for the primary shield 28 is not shown in FIG. 1 but the center-tapped connection 32 for the secondary shield 30 is shown in FIG. 1. In the exemplary embodiment of the earlier cited copending related application of Harold A. Gauper, Jr., the center-tapped connection of the secondary shield is connected to the center tap 14 of the secondary transformer winding 12. As earlier briefly explained, if the construction symmetry of the coil, shield and center-tapping of each were absolutely precisely accurate and perfect, then theoretically the center-tapped connection 14 would be maintained at a constant potential with respect to the outside world or with respect to the guard shield so as to produce no common mode noise $E_{n(com)}$ with respect to some constant potential such as the earth. However, because perfection can never actually and reliably be achieved, it has been noticed in practice that a common mode voltage will exist on the transformer output windings with respect to the outer guard shell or with respect to the earth, etc. Typically, such common mode noise signals may be on the order of 100 millivolts in a typical line cord power supply unit delivering perhaps 10V nominal d.c. output at $E_o$.

To correct for such imbalance and imperfections, this invention provides a signal pickup means which is connected between the secondary winding and the secondary shield to inject a cancellation signal which is effectively connected in series between the center tap of the transformer winding and the center tap of the secondary shield. This cancellation signal is preferably of substantially equal magnitude and opposite phase to the unwanted common mode EMI signal otherwise experienced. In other words, in the exemplary embodiment, the cancellation signal would also be of substantially square wave shaped alternating signal having approximately 100 millivolts amplitude and of opposite phase to the normally expected common mode EMI signal. The net result is to substantially reduce the electrical potential variations between the center tap of the secondary winding and other shielding and/or the earth reference potential while additionally providing electrical isolation therebetween in an electrical conductivity sense. In actual practice, it has been observed that such injection of a cancellation signal can effectively reduce the otherwise 100 millivolt EMI common mode noise to less than 1 millivolt common mode EMI noise. As will be appreciated, this approximately 100 to 1 reduction in EMI is a substantial improvement and benefit to the overall EMI shielding and suppression in the power supply unit in question.

The particular exemplary embodiment shown in FIG. 1 involves a signal pickup means comprising a voltage divider formed from two ganged series connected adjustable capacitors connected across the outer terminals of the secondary winding. By adjusting the capacitors, a cancellation voltage of proper magnitude and phase is obtained at 34 and connected to the center tap of the secondary shield 32 for substantially reducing variations in the electrical potential between the center tap 14 of the secondary windings and the other shielding such as the outer guard shield while additionally providing isolation therebetween. In this arrangement, the ganged capacitors are adjusted while the common mode noise output is observed and minimized at a selected frequency harmonic component of the square wave fundamental frequency. The result is the injection of a cancellation signal or voltage of proper magnitude and phase so as to minimize the EMI output common mode signal. As observed on oscilloscope monitoring of such common mode noise, this invention provides a reduction of typically 100 to 1 in the exemplary embodiment.

The other exemplary embodiment shown in FIG. 2 provides a more direct serial connection of the signal pickup means between the center tap of the secondary winding and the center tap of the secondary shield. Here, a separate winding on the transformer such as a single turn, is utilized to develop a voltage of appropriate wave shape for the cancellation signal while a capacitive voltage divider thereacross is adjusted to develop the proper magnitude for effective cancellation of residual common mode EMI under varying load conditions. As shown in FIG. 2, the output of this voltage divider across capacitor $C_2$ is serially connected between the center tap of the secondary winding and the center tap of the secondary shield. Since the cancellation signal across capacitor $C_2$ is of opposite phase and similar magnitude to the unwanted common mode EMI signal, it follows that the EMI signal is substantially suppressed. Typically, in actual practice, otherwise encountered EMI signals of approximately 100 millivolts in magnitude have been reduced to less than 1 millivolt using this exemplary embodiment of FIG. 2. For any given particular embodiment, the capacitive divider ratio of such a voltage divider as shown in FIG. 2 is selected to match the nominal unbalanced residual EMI common mode noise for a particular power supply design. The trimmer is then used to adjust the actual voltage divider output to an optimum value as should now be appreciated.

In essence, the embodiment of FIG. 2 involves the injection of the voltage across capacitor $C_2$ (i.e., the cancellation signal) in series with residual EMI common mode to earth signal resulting in substantial cancellation of such common mode EMI to give an extremely low resultant common mode EMI. As previously mentioned, reductions of up to 40 db or more can be expected with the exemplarly embodiments of this invention as described above.

Of course, those in the art will appreciate that other types of voltage dividers and signal pickup means may be provided for producing the cancellation signal having substantial equal magnitude and opposite phase to the unwanted common mode EMI signal. For instance resistive dividers or inductive dividers might be utilized. It is also possible that the signal pickup means itself could be devised with an inductive relationship to the magnetic flux available in the transformer such that a signal of substantially proper magnitude and polarity is produced without a voltage divider for the cancellation signal. These and many other modifications and variations of the specific exemplary embodiments described above will be apparent to those in the art. Even though only a few specific detailed exemplary embodiments have been described above, all such variations and modifications are intended to be included within the scope of this invention as defined in the appended claims.

What is claimed is:

1. An electromagnetically shielded electrical power supply comprising:
   an inverter driven transformer having primary and secondary windings,
   an electrostatic shield about the secondary windings of the transformer,
   other electrostatic shielding associated with other components of the power supply,
   said secondary winding shield being electrically isolated from said other electrostatic shielding thereby giving rise to potential common mode interference signal superimposed on the electrical output from said secondary windings with respect to said other shielding,
   signal pickup means for producing a cancellation signal substantially equal in magnitude and of substantially opposite phase with respect to said interference signal,
   said signal pickup means being connected to said secondary winding and to said secondary winding shield so as to effectively add said cancellation signal to said interference signal and to thereby substantially reduce unwanted common mode signal emanations from the output of said power supply.

2. An electromagnetically shielded electrical power supply as in claim 1 wherein said secondary windings comprise a center-tapped winding and wherein said signal pickup means is serially connected between the center tap of the secondary windings and said secondary winding shield.

3. An electromagnetically shielded electrical power supply as in claim 1 wherein said secondary winding shield has a center tap connection located at a null point on the shield where the induced voltages in the shield are substantially balanced out to a minimum magnitude and where said signal pickup means is electrically connected to said shield center tap connection.

4. An electromagnetically shielded electrical power supply as in claim 2 wherein said secondary winding shield has a center tap connection located at a null point on the shield where the induced voltages in the shield are substantially balanced out to a minimum magnitude and where said signal pickup means is electrically connected to said shield center tap connection.

5. An electromagnetically shielded electrical power supply as in claim 1 wherein said signal pickup means comprises a separate transformer winding having a voltage divider connected thereto for providing said cancellation signal.

6. An electromagnetically shielded electrical power supply as in claim 5 wherein said voltage divider is adjustable to correspondingly adjust the electrical characteristics of said cancellation signal.

7. An electromagnetically shielded electrical power supply as in claim 5 wherein said voltage divider comprises capacitor components.

8. An electromagnetically shielded electrical power supply as in claim 2 wherein said signal pickup means comprises a separate transformer winding having a voltage divider connected thereto for providing said cancellation signal.

9. An electromagnetically shielded electrical power supply as in claim 3 wherein said signal pickup means comprises a separate transformer winding having a voltage divider connected thereto for providing said cancellation signal.

10. An electromagnetically shielded electrical power supply as in claim 4 wherein said signal pickup means comprises a separate transformer winding having a voltage divider connected thereto for providing said cancellation signal.

11. An electromagnetically shielded electrical power supply as in claim 1 wherein said signal pickup means comprises a voltage divider connected across said secondary winding for producing said cancellation signal.

12. An electromagnetically shielded electrical power supply as in claim 11 wherein said secondary winding shield has a center tap connection located at a null point on the shield where the induced voltages in the shield are substantially balanced out to a minimum magnitude and where said signal pickup means is electrically connected to said shield center tap connection.

13. An electromagnetically shielded electrical power supply as in claim 11 wherein said signal pickup means comprises a separate transformer winding having a voltage divider connected thereto for providing said cancellation signal.

14. An electromagnetically shielded electrical power supply as in claim 13 wherein said voltage divider comprises capacitor components.

15. An electromagnetically shielded electrical power supply as in claim 1 wherein said signal pickup means comprises a voltage divider connected across a voltage source located within the circuitry of said power supply for producing said cancellation signal.

16. An electromagnetically shielded electrical power supply as in claim 15 wherein said secondary windings comprise a center-tapped winding and wherein said signal pickup means is serially connected between the center tap of the secondary windings and said secondary winding shield.

17. An electromagnetically shielded electrical power supply as in claim 15 wherein said secondary winding shield has a center tap connection located at a null point on the shield where the induced voltages in the shield are substantially balanced out to a minimum magnitude and where said signal pickup means is electrically connected to said shield center tap connection.

18. An electromagnetically shielded electrical power supply as in claim 1 wherein said secondary windings comprise a center-tapped winding and wherein said signal pickup means is connected to substantially reduce variations in the electrical potential between the center tap of the secondary windings and said other shielding in spite of the electrical isolation therebetween.

19. An electromagnetically shielded electrical power supply as in claim 18 wherein said secondary winding shield has a center tap connection located at a null point on the shield where the induced voltages in the shield are substantially balanced out to a minimum magnitude and where said signal pickup means is electrically connected to said shield center tap connection.

* * * * *